(12) United States Patent
Katic

(10) Patent No.: US 7,242,712 B1
(45) Date of Patent: Jul. 10, 2007

(54) DECISION FEEDBACK EQUALIZER (DFE) FOR JITTER REDUCTION

(75) Inventor: Ognjen Katic, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 179 days.

(21) Appl. No.: 11/074,966

(22) Filed: Mar. 8, 2005

Related U.S. Application Data

(60) Provisional application No. 60/551,148, filed on Mar. 8, 2004.

(51) Int. Cl.
*H03H 7/30* (2006.01)
(52) U.S. Cl. ..................................... 375/233
(58) Field of Classification Search ................ 375/229, 375/230, 232, 233, 234, 350
See application file for complete search history.

(56) References Cited

U.S. PATENT DOCUMENTS

| | | | |
|---|---|---|---|
| 5,020,078 A | 5/1991 | Crespo | |
| 5,058,130 A | 10/1991 | Park | |
| 5,434,884 A | 7/1995 | Rushing et al. | |
| 5,581,585 A | 12/1996 | Takatori et al. | |
| 5,594,756 A | 1/1997 | Sakurai et al. | |
| 5,608,757 A | 3/1997 | Smith et al. | |
| 5,675,612 A | 10/1997 | Solve et al. | |
| 5,748,674 A | 5/1998 | Lim | |
| 5,903,605 A | 5/1999 | Crittenden | |
| 5,991,339 A | 11/1999 | Bazes et al. | |
| 6,414,990 B1 | 7/2002 | Jonsson et al. | |
| 6,501,792 B2 | 12/2002 | Webster | |
| 6,697,424 B1 * | 2/2004 | Yang et al. | 375/233 |
| 7,016,406 B1 * | 3/2006 | Phanse et al. | 375/232 |
| 2004/0234002 A1 * | 11/2004 | Yang et al. | 375/263 |

OTHER PUBLICATIONS

Qureshi, Shahid U. H., "Adaptive Equalization", Proceedings of the IEEE, vol. 73, No. 9, Sep. 1985, Institute of Electrical and Electronics Engineers, Inc., pp. 1349-1381.

* cited by examiner

*Primary Examiner*—Tesfladet Bocure
(74) *Attorney, Agent, or Firm*—Knobbe Martens Olson & Bear LLP

(57) ABSTRACT

A decision feedback equalizer (DFE) for a receiver that can reduce jitter is disclosed. The DFE uses an equalizer structure that employs a symbol sampling operation at a decision device, also known as a slicer. In a receiver, the phase of a signal, such as an equalized signal, is typically estimated from zero crossings in the clock recovery operation. Fluctuations in these zero crossings makes phase of the reproduced clock unstable, which decreases error performance in an associated receiver. Embodiments advantageously align inter-symbol interference (ISI) canceling terms from a feedback filter (FBF) relatively well, and thereby provide equalization of a relatively large portion of a symbol period. This advantageously stabilizes the phase of an equalized signal and reduces jitter.

22 Claims, 18 Drawing Sheets

DECISION FEEDBACK EQUALIZER (DFE) FOR JITTER REDUCTION

RELATED APPLICATION

This application claims the benefit under 35 U.S.C. § 119(e) of U.S. Provisional Application No. 60/551,148, filed Mar. 8, 2004, the entirety of which is hereby incorporated by reference.

BACKGROUND

1. Field of the Invention

The invention generally relates to digital communications. In particular, the invention relates to equalization techniques in a receiver.

2. Description of the Related Art

A variety of physical impairments can limit the effective transmission of data signals over communications channels. For example, the frequency selective nature of a communication channel attenuates and phase shifts the various frequency components of an input signal differently depending on frequency. A corresponding impulse response can span several symbol intervals, which can result in time smearing and interference between successive transmitted input symbols, which is known as inter-symbol interference (ISI). The ISI resulting from the channel distortion, if left uncompensated, can undesirably result in relatively high error rates. One approach to the ISI problem is to have a receiver compensate or reduce the ISI in the received signal with an equalizer.

There are two general classes of equalization techniques to mitigate ISI: (a) Maximum likelihood sequence estimation (MLSE) techniques and (b) sub-optimal equalizer structures.

With maximum likelihood sequence estimation (MLSE) techniques, a dynamic programming algorithm is used to determine the most likely transmitted sequence given observations of the received noisy and ISI-corrupted sequence, and given knowledge of the channel impulse response coefficients. MLSE techniques use a sequence of received signal samples over successive symbol intervals to make decisions about the transmitted symbols, and MLSE techniques are optimal from a bit error rate (BER) perspective. However, MLSE techniques have a computational complexity that grows exponentially with the length of the channel time dispersion, and in most channels of practical interest, such a large computational complexity can be prohibitively expensive to implement.

Examples of sub-optimal equalizer structures include a linear equalizer (LE) and a decision feedback equalizer (DFE). With a linear equalizer (LE) or with a decision feedback equalizer (DFE), data detection is performed on a symbol-by-symbol basis and hence can be much simpler to implement than with maximum likelihood sequence estimation MLSE techniques. See, for example, Proakis, John G., *Digital Communications*, McGraw-Hill, ($3^{rd}$ Edition 1995), U.S. Pat. No. 5,058,130 to Park and U.S. Pat. No. 6,414,990 B1 to Jonsson et al.

In a linear equalizer (LE), a simple finite impulse response (FIR) filter is used to mitigate ISI. A linear equalizer (LE) uses a linear filter with adjustable or fixed coefficients.

In a decision feedback equalizer (DFE), in addition to the feed-forward FIR filter of the linear equalizer (LE), the DFE uses a feedback filter (FBF) with the previously detected symbols. The feedback filter (FBF) of the DFE suppresses that part of the inter-symbol interference (ISI) from the present estimate caused by previously detected symbols. A DFE typically yields a significant improvement in performance relative to a linear equalizer (LE) having the same number of taps when the channel frequency response is severely distorted. Advantages of a decision feedback equalizer (DFE) over a linear equalizer (LE) include compensation for channel distortions without as much noise enhancement and less sensitive performance to the sampler phase.

Decision Feedback Equalizer (DFE) Example (FIG. 1)

A decision feedback equalizer (DFE) can be incorporated in a receiver in a broad variety of ways. FIG. 1 illustrates an example of a typical configuration of a receiver of a digital communications system, where the decision feedback equalizer (DFE) is decoupled from the symbol synchronization. In FIG. 1, the decision feedback equalizer (DFE) includes a feed forward filter (FF filter), a differencing or subtracting circuit, a slicer, and a feedback filter (FB filter).

In the simple receiver of FIG. 1, analog signal processing of the received signal $x_A(t)$ is used to derive a (symbol timing) clock signal. This clock signal is used to sample the received signal $x_A(t)$ and to produce a discrete signal $x_D(nT)$, which is provided as an input to the decision feedback equalizer (DFE). Feed-forward filter (FF filter) generates an output signal $x_D^f(nT)$ relatively free of the pre-cursor inter-symbol interference (ISI) terms present in the discrete signal $x_D(nT)$. The feedback filter (FB filter) uses the previously detected symbol sequence, i.e., hard decision output $d(nT)$, to generate recreated signal $z_D(nT)$, which contains the post-cursor ISI terms. The recreated signal $z_D(nT)$ is subtracted from the discrete signal $x_D^f(nT)$ to generate a soft equalizer output signal $y_D(nT)$, which is relatively free from ISI and is provided as an input to the slicer to make the final decisions about the transmitted symbol sequence.

The timing phase of the received signal $x_A(t)$ can be estimated using the zero-crossing time of the received signal $x_A(t)$. Fluctuations in the zero-crossings of the received signal $x_A(t)$ can render the phase of the clock signal unstable, which decreases the error performance of the receiver. There are different approaches to overcome this problem. One approach is to use a phase locked loop with a very narrow loop bandwidth. Another approach is to move the operation of the decision feedback equalizer (DFE) to the analog domain and arrange the taps of the DFE to minimize jitter rather than minimize ISI at the sampling point. For example, see U.S. Pat. No. 5,058,130. Another approach is to couple the timing phase estimation with the equalizer by providing the hard decision output $d(nT)$ as an input to the timing phase estimation, see Proakis. Another approach is to arrange the taps of the DFE to optimize a cost function associated with the performance of the equalizer structure, see U.S. Pat. No. 6,414,990. One drawback of these techniques is their increased complexity.

Digital DFE with Feedback Filter Only (FIG. 2)

When the pre-cursor inter-symbol interference (ISI) terms of the channel impulse response are relatively small, the feed forward filter (FF filter) portion of the decision feedback equalizer (DFE) of the receiver illustrated in FIG. 1 can be omitted as illustrated in the receiver configuration of FIG. 2. The feedback filter (FB filter) is retained to remove post-cursor inter-symbol interference (ISI).

In the receiver illustrated in FIG. 2, the received analog signal $x_A(t)$ is sampled with an n-bit analog-to-digital converter (ADC) to generate a discrete signal $x_D(nT)$. The samples of the discrete signal $x_D(nT)$ are provided as an input to the subtractor, where the inter-symbol interference (ISI) is cancelled by subtraction with the recreated signal $z_D(nT)$, producing the soft decision feedback equalizer (DFE) output signal $y_D(nT)$. The slicer receives the soft DFE output signal $y_D(nT)$ as an input, and the slicer generates the hard decision output sequence $d(nT)$ as an output. The coefficients of the feedback filter $h_k(k=1, \ldots, n)$ represent the post-cursor samples of the overall channel impulse response and may be obtained in a variety of ways. When the corresponding impulse response of the channel is relatively well known, the coefficients $h_k$ may be predetermined and fixed to the corresponding values. Or, for channels of unknown characteristic or for adaptive modes of operation, the coefficients can be computed using an algorithm such as least-mean-squares (LMS).

In a relatively high-speed base-band transmission system, such as 5 Gbit/s systems or faster systems employing high-speed SerDes devices, the n-bit ADC converter described in the receiver configuration illustrated in FIG. 2 can be very expensive and can be economically impractical. To avoid the usage of high-speed n-bit ADCs, the sampling function can be moved to the slicer block. FIG. 3 illustrates a model of this analog implementation of the decision feedback equalizer (DFE).

Model 1 of the DFE Analog Implementation (FIG. 3)

FIG. 3 illustrates a first model of a decision feedback equalizer (DFE) of a receiver configuration. The subtracting circuit operates in the analog domain. A corresponding data eye will be described later in connection with FIG. 6. A corresponding timing diagram will be described later in connection with FIG. 7.

In the model illustrated in FIG. 3, while both the sampling of an equalized signal $y_A(t)$ and a zero-order-hold (ZOH) performed on the recreated signal $z_D(nT)$ are explicitly drawn, it will be understood that the sampling of the equalized signal $y_A(t)$ to the soft equalizer output signal $y_D(nT)$, and the zero-order-hold (ZOH) performed can be implicit in the operation of the slicer and feedback filter (FBF), respectively. The explicit blocks are illustrated to emphasize the analog nature of the subtracting circuit as opposed to the digital subtracting circuits illustrated in FIG. 1 and FIG. 2.

The zero-order-hold (ZOH) of the feedback filter (FBF) holds the analog signal $z_{DA}(t)$ constant during the symbol interval T and changes the value abruptly at the sampling instants. In this manner, the feedback filter is similar to a digital-to-analog converter (DAC).

In some applications, the received signal $x_A(t)$ may be fractionally sampled, i.e., sampled at a higher rate than the symbol rate, and passed to the decision feedback equalizer (DFE) of the receiver model illustrated in FIG. 3. Both the illustrated digital implementation and a true analog implementation of a decision feedback equalizer (DFE) are referred to as a decision feedback equalizer (DFE) herein.

In a practical true analog implementation of DFE, the first flip-flop in the delay buffer of the feedback filter (FBF) typically performs three tasks: sampling, slicing and delay. Hence, a model illustrated in FIG. 4 also describes the operation of an decision feedback equalizer (DFE).

Model 2 of the DFE Analog Implementation (FIG. 4)

FIG. 4 illustrates a second model (model 2) of a decision feedback equalizer (DFE) of a receiver configuration. A corresponding data eye diagram for the second model will be described later in connection with FIG. 8, and a corresponding timing diagram will be described later in connection with FIG. 9. The first delay T of the feedback filter (FBF) of model 1 is not present in model 2. Model 2 includes a delay $\tau_1$ that represents a flip-flop propagation delay within the slicer. The flip-flop propagation delay $\tau_1$ corresponds to a value between 0 and T ($0 < \tau_1 < T$).

Simulated Data Eye Diagram of the Received Signal $x_A(t)$ (FIG. 5)

When a transmission channel introduces significant amounts of inter-symbol interference (ISI), the associated system performance can be relatively poor when a simple clock recovery unit based on the zero-crossings of the received signal is employed in the receiver. This often happens with base-band high-speed signaling (>5 Gbit/s) over back-plane channels that create mostly post-cursor ISI terms.

FIG. 5 is a simulated example of a data eye diagram of non-return to zero (NRZ) signaling at 5 Gbit/s over a typical 30-inch channel for the received signal $x_A(t)$ with relatively large amounts of inter-symbol interference (ISI). A "data eye" corresponds to superimposed waveforms for binary bits of "0" and "1" within a bit period. FIG. 5 illustrates two data eyes of two successive bit (symbol) intervals. Bold vertical lines at about $1 \times 10^{-10}$ and $3 \times 10^{-10}$ seconds illustrate relatively good decision points for a slicer (or for sampling for the slicer). In one embodiment, these relatively good decision points are approximately in the middle of a symbol interval.

As illustrated by the data eye diagram of FIG. 5, the zero-crossing variation (crossings over or under 0 amplitude) due to inter-symbol interference (ISI) is large enough to produce a significant amount of jitter. This can be problematic when techniques such as an early-late gate synchronizer are used without sufficient averaging. Consequently, bit-error-rate (BER) performance of the system will tend to be relatively low.

When the received signal $x_A(t)$ corresponding to the data eye diagram of FIG. 5 is equalized with a decision feedback equalizer (DFE) structure as illustrated in FIG. 3, the DFE cancels the inter-symbol interference (ISI) terms relatively well typically only at sampling points. Furthermore, the discrete time nature of analog signal $z_{DA}(t)$ introduces jumps (discontinuities) in the equalized signal $y_A(t)$ at the sampling instants as illustrated in simulated example of FIG. 6.

Simulated Data Eye Diagram at the Slicer Input After Applying Model 1 of Conventional DFE (FIG. 6)

The data eye diagram for the slicer input corresponds to the equalized signal $y_A(t)$ of FIG. 3. In the simulated example of FIG. 6, the corresponding receiver (modeled earlier in FIG. 3) uses a decision feedback equalizer (DFE) that cancels all post-cursor ISI terms. The two distinct levels at the sampling instants ($1 \times 10^{-10}$ and $3 \times 10^{-10}$ seconds in FIG. 6) are the consequence of the single dominant pre-cursor term of the simulated channel.

As illustrated by the data eyes in FIG. 6, the first half, e.g., between $0 \times 10^{-10}$ and $1 \times 10^{-10}$ seconds, of the symbol interval is relatively corrupted while the second half, e.g., between $1 \times 10^{-10}$ and $2 \times 10^{-10}$ seconds, is relatively clean. This is explained further by the timing diagram illustrated in FIG. 7 for the decision feedback equalizer (DFE) described earlier in connection with FIG. 3.

Operation of a Conventional DFE Using Model 1 (FIG. 7)

Five signals relevant to the description of the operation of the decision feedback equalizer (DFE) are presented in FIG. 7: transmitted signal sequence $s(t)$, received clock signal rx_clk, equalized signal $y_A(t)$, slicer output signal $d(t)$ and delayed slicer output signal $d(t-T)$. The transmitted signal sequence $s(t)$ corresponds to the symbol sequence carried by the received signal $x_A(t)$. The slicer output $d(t)$ corresponds to the continuous time observation of the otherwise discrete time hard decision output d(nT). The delayed slicer output signal d(t−T) is a continuous time representation of the first delay T of the feedback filter (FBF). The delayed slicer output signal d(t−T) is time delayed by a symbol period from the slicer output d(t) and is used in the feedback filter (FBF) to cancel the post-cursor inter-symbol interference (ISI) from the previously detected symbol.

Three successive symbol intervals are marked as A, B and C representing the current symbol (C) and two previous symbols (A and B). For clarity, the example is illustrated assuming that the channel characteristic is such that only one post-cursor inter-symbol interference (ISI) component is created, e.g., the inter-symbol interference (ISI) in symbol C is a result only of transmission of symbol B.

Furthermore, in this simulated example, zero channel delay is used, i.e., transmitted signal sequence s(t) and equalized signal $y_A(t)$ are perfectly aligned in time as shown in the figure. The received signal $x_A(t)$ of FIG. 3 is also perfectly aligned with equalized signal $y_A(t)$ in the simulation.

In this example, the slicer determines the symbols of the transmitted data at the peaks of equalized signal $y_A(t)$, and the slicer output d(t) is delayed by half a symbol period with respect to transmitted signal sequence s(t). After that, the delayed slicer output signal d(t−T) will be properly weighted in the feedback filter and subtracted from the received signal $x_A(t)$ in order to produce the equalized signal $y_A(t)$.

Due to a half symbol delay at the slicer, only the second half of current symbol C carried by the equalized signal $y_A(t)$ overlaps with the interfering previous symbol B portion of the delayed slicer output signal d(t−T), while the first half of the current symbol C overlaps with the symbol A portion of the delayed slicer output signal d(t−T).

The inter-symbol interference (ISI) term from symbol B has been effectively cancelled in the equalized signal $y_A(t)$ only at the sampling instants because the received signal $x_A(t)$, from which the equalized signal $y_A(t)$ is generated, is an analog signal with varying analog voltage levels during a symbol interval. As time proceeds from a sampling point (moving to the right in FIG. 6), the inter-symbol interference (ISI) cancellation error in the equalized signal $y_A(t)$ increases. The ISI cancellation error is even larger earlier in time to a sampling instant (to the left of a sampling instant in FIG. 6) because prior to the sampling instant, the canceling term is based on previous symbol A instead of previous and interfering symbol B. For this reason, equalized signal $y_A(t)$ exhibits the data eye illustrated in FIG. 6.

However, if the received signal $x_A(t)$ is equalized with a decision feedback equalizer (DFE) structure corresponding to the model illustrated FIG. 4, the resulting data eye diagram exhibits discontinuous behavior as illustrated in FIG. 8.

Simulated Eye Diagram at the Slicer Input After Applying Model 2 of Classical DFE (FIG. 8)

The data eye diagram for the slicer input corresponds to the equalized signal $y_A(t)$ of FIG. 4. In contrast to the behavior of the decision feedback equalizer (DFE) behavior according to model 1 and FIGS. 3, 6, and 7, the DFE according to model 2 exhibits nearly the opposite characteristics. The DFE according to model 2 was previously described earlier in connection with FIG. 4. The data eye diagram in FIG. 8, and a timing diagram in FIG. 9 also correspond to the DFE according to model 2. In the data eye diagram of FIG. 8, the second half, e.g., $1 \times 10^{-10}$ and $2 \times 10^{-10}$ seconds of the symbol interval is relatively corrupted while the first half of the symbol interval, e.g., $0 \times 10^{-10}$ and $1 \times 10^{-10}$ seconds is relatively clean.

Operation of a Conventional DFE Using Model 2 (FIG. 9)

The behavior of a DFE according to model 2 will now be described with reference to the timing diagram of FIG. 9. Four signals relevant to the description of the operation of the decision feedback equalizer (DFE) are presented in FIG. 9: transmitted signal sequence s(t), received clock signal rx_clk, equalized signal $y_A(t)$, and slicer output signal $d(t-\tau_1)$.

As illustrated in FIG. 9, the slicer output signal $d(t-\tau_1)$ is offset in time from the equalized signal $y_A(t)$. The offset $\tau_1$ can be arbitrary and represents the propagation delay of the first flip-flop, which, for an ideal flip-flop, approaches 0. It will be understood, however, that with relatively high bit rates, the propagation delay $\tau_1$ can be relatively large and should not be ignored. The slicer output signal $d(t-\tau_1)$ is used in the feedback filter (FBF) to cancel the post-cursor inter-symbol interference (ISI) from the previously detected symbol.

Three successive symbol intervals are indicated as A, B, and C representing the current symbol (A) and two previous symbols (B and C). For clarity, the simulated channel characteristic is such that only one post-cursor inter-symbol interference (ISI) component is created (the ISI in present symbol C is a result only of transmission of symbol B).

The slicer determines the symbols of the transmitted data at the peaks of equalized signal $y_A(t)$. The slicer output signal $d(t-\tau_1)$ is weighted in the feedback filter by the coefficients $h_1, h_2, \ldots h_n$, illustrated in FIG. 4 and subtracted from the received signal $x_A(t)$ to produce the equalized signal $y_A(t)$.

Due to a delay at the slicer, the first half of the symbol C portion of equalized signal $y_A(t)$ plus a delay $\tau_1$ (flip-flop propagation delay) overlaps with the interfering prior symbol B of the slicer output signal $d(t-\tau_1)$, while the second half minus the delay $\tau_1$ overlaps with a portion of symbol C from the slicer output signal d(t). In a case with ideal components where the flip-flop propagation delay $\tau_1$ approaches 0, the "clean" and "corrupted" intervals are each T/2.

The inter-symbol interference (ISI) term from prior symbol B has been effectively cancelled in the equalized signal $y_A(t)$ only at the sampling instants, e.g., $1.0 \times 10^{-10}$ and $3.0 \times 10^{-10}$ seconds, because the received signal $x_A(t)$, from which the equalized signal $y_A(t)$ is generated, is an analog signal with varying analog voltage levels during a symbol interval. Earlier in time to the sampling points (to the left in FIG. 9), the ISI cancellation error in equalized signal $y_A(t)$ increases. Shortly after the sampling instants (to the right in FIG. 9), the ISI cancellation error is relatively large because the canceling term is based on current symbol C instead of previous and interfering symbol B. As a result, the equalized signal $y_A(t)$ exhibits the data eye illustrated in FIG. 8.

SUMMARY

A decision feedback equalizer (DFE) for a receiver for a data communications device with reduced jitter is disclosed. In a receiver, the phase of a signal, such as an equalized signal, is typically estimated from zero crossings in the clock recovery operation. Fluctuations in these zero crossings can render the phase of a reproduced clock unstable, which decreases error performance in the associated receiver. Embodiments advantageously align inter-symbol interference (ISI) canceling terms from a feedback filter (FBF)

relatively well, and thereby provide equalization of a relatively large portion of a symbol period. This advantageously stabilizes the phase of an equalized signal and reduces jitter.

One embodiment is a receiver with a decision feedback equalizer (DFE), where the receiver includes: a subtracting circuit configured to receive a received signal and a feedback signal as inputs, where the received signal has embedded therein symbols at a symbol rate with symbol intervals, where the subtracting circuit is configured to subtract the feedback signal from the received signal to generate an equalized signal for reduction of inter symbol interference (ISI); a slicer in communication with the subtracting circuit to receive the equalized signal as an input, where the slicer is configured to determine a logical state of the equalized signal and to provide an output signal; and a feedback filter circuit in communication with the slicer and the subtracting circuit, where the feedback filter circuit is configured to receive the output signal from the slicer as an input and to provide the feedback signal to the subtracting circuit, where the feedback signal has canceling terms for cancellation of one or more post-cursor ISI terms by the subtracting circuit, where the feedback filter circuit includes a first delay tap for a feedback filter, where the first delay tap is configured to delay the feedback signal such that transitions of the feedback signal are substantially time aligned with symbol interval transitions of the received signal for the subtracting circuit.

The receiver can be embodied in a wide variety of data communication devices, such as a serializer/deserializer (SerDes). One embodiment further includes a low-pass filter for the feedback signal disposed in a communication path between the feedback filter circuit and the subtracting circuit. One embodiment further includes an adaption engine in communication with the feedback filter circuit, where the adaption engine is configured to determine filter coefficients for the feedback filter circuit. One embodiment includes further comprises a switch in communication with the clock recovery circuit, where the switch is configured to provide the clock recovery circuit with the equalized signal during normal operation and to provide the clock recovery circuit with the received signal during determination of the filter coefficients by the adaption engine.

One embodiment is a receiver with a decision feedback equalizer (DFE), where the receiver includes: a subtracting circuit configured to receive a received signal and a feedback signal as inputs, where the received signal has embedded therein symbols at a symbol rate with symbol intervals, where the subtracting circuit is configured to subtract the feedback signal from the received signal to generate an equalized signal for reduction of inter-symbol interference (ISI); a slicer in communication with the subtracting circuit to receive the equalized signal as an input, where the slicer is configured to determine the symbols in the equalized signal and to provide an output signal; a feedback filter circuit in communication with the slicer and the subtracting circuit, where the feedback filter circuit is configured to receive the output signal from the slicer as an input and to provide the feedback signal to the subtracting circuit, where the feedback signal has canceling terms for cancellation of one or more post-cursor ISI terms by the subtracting circuit; and means for timing the feedback signal such that a transition in the feedback signal is time aligned with a transition in the received signal.

One embodiment is a method of feedback equalization in a receiver, where the method includes: receiving a received signal having embedded therein symbols at a symbol rate with symbol intervals; subtracting a feedback signal from the received signal to generate an equalized signal; determining symbols of the equalized signal for an output signal; generating the feedback signal from the output signal, wherein the feedback signal includes cancellation terms for cancellation of inter-symbol interference (ISI); and timing the feedback signal such that a transition in the feedback signal is time aligned with a transition in the received signal.

BRIEF DESCRIPTION OF THE DRAWINGS

These drawings and the associated description herein are provided to illustrate embodiments of the invention, and are not intended to be limiting.

DETAILED DESCRIPTION OF CERTAIN EMBODIMENTS

Although particular embodiments are described herein, other embodiments, including embodiments that do not provide all of the benefits and features set forth herein, will be apparent to those of ordinary skill in the art.

In both model 1 and model 2 of the conventional decision feedback equalizers (DFE) described earlier, inter-symbol interference is desirably reduced at the sampling instants. However, at other times of a symbol period, each of model 1 and model 2 inadequately equalize the received signal $x_A(t)$ to the equalized signal $y_A(t)$. Equalization of relatively larger portions of the symbol period desirably can reduce jitter, which can advantageously improve the bit error rate (BER) of an associated receiver.

Figure 10:
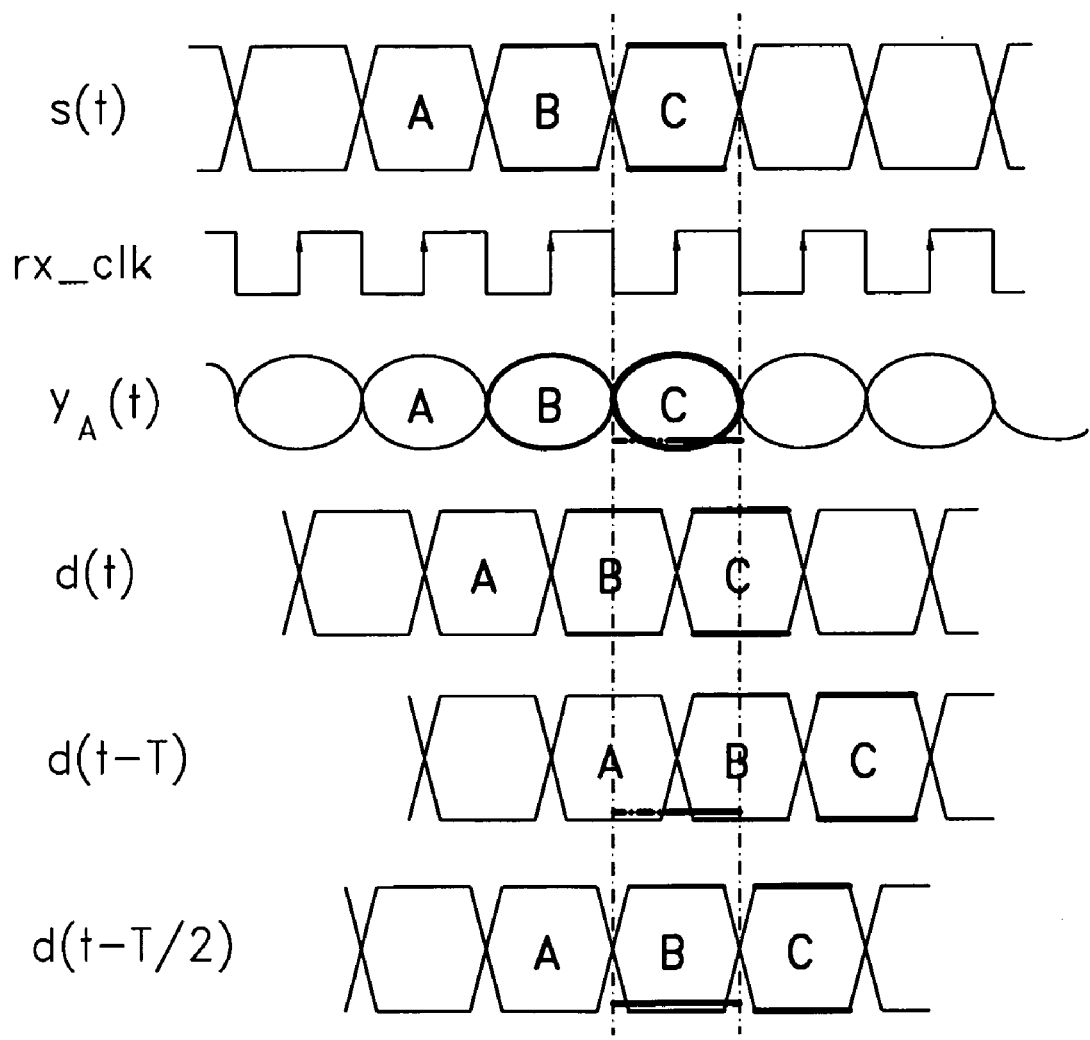
FIG. 10 illustrates an example of a timing diagram for improved model 1.

Operation of Jitter Reducing Decision Feedback Equalizer (DFE) According to Improved Model 1 (FIG. 10)

Figure 1:
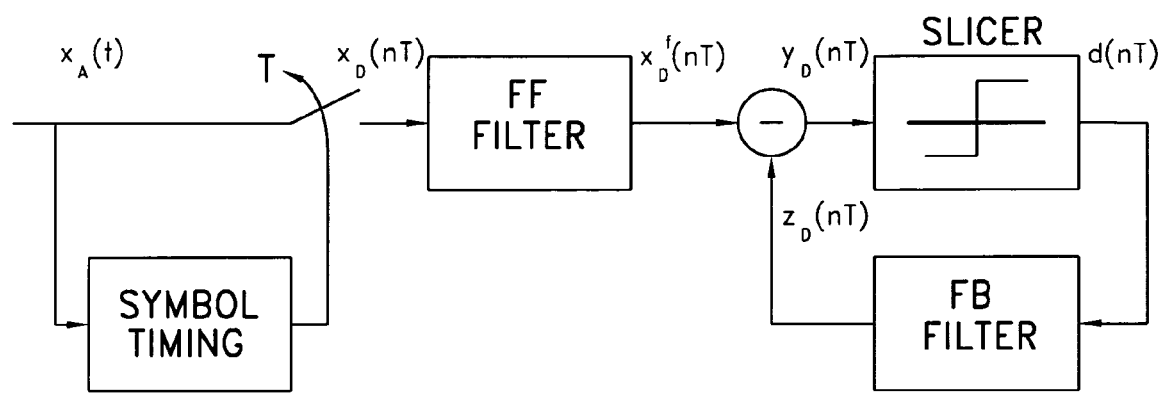
FIG. 1 illustrates an example of a conventional configuration of a receiver of a digital communications system, where the decision feedback equalizer (DFE) is decoupled from the symbol synchronization.
Figure 2:
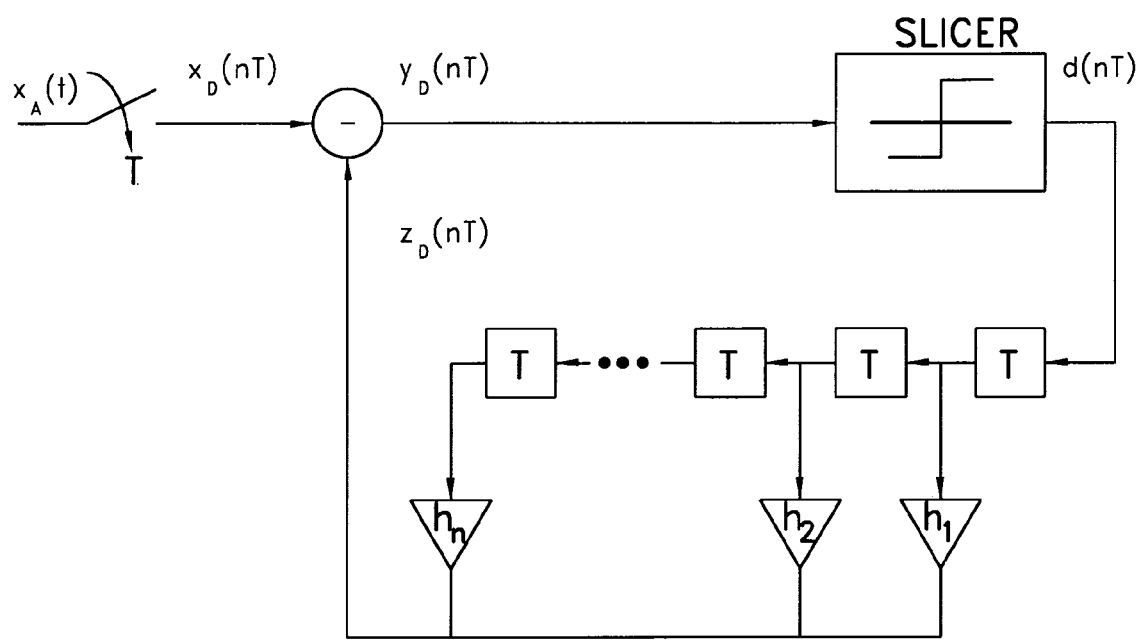
FIG. 2 illustrates a conventional configuration of a receiver with a decision feedback equalizer without a feed forward filter.
Figure 3:
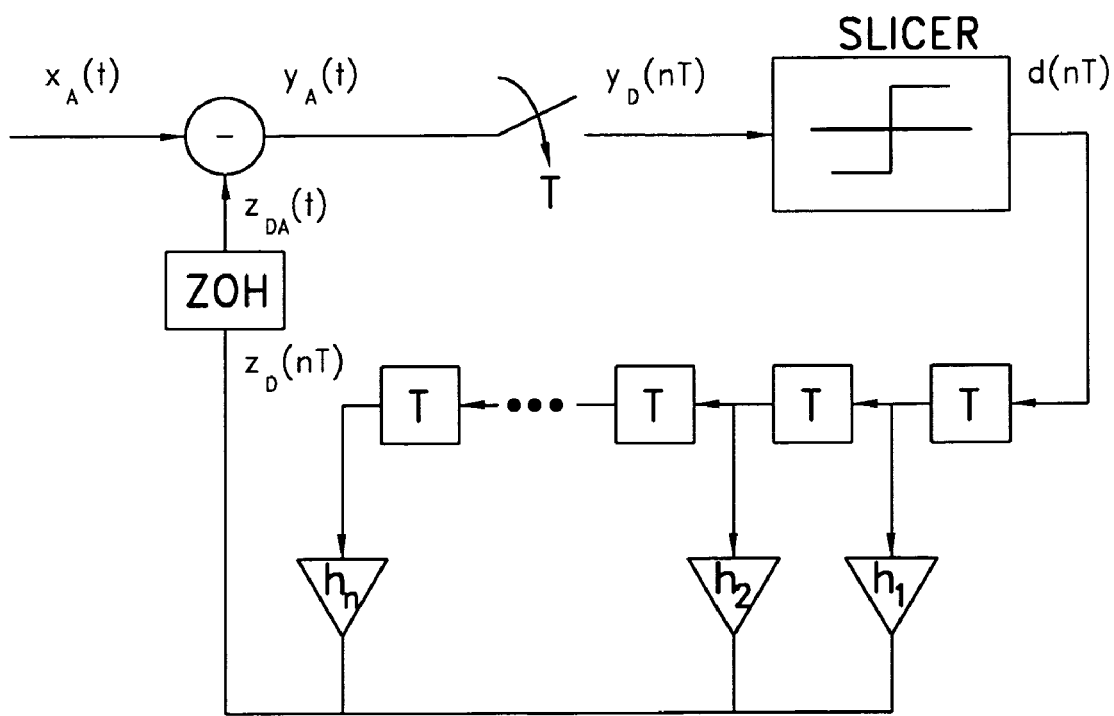
FIG. 3 illustrates a first model (model 1) of an analog decision feedback equalizer (DFE).
Figure 6:
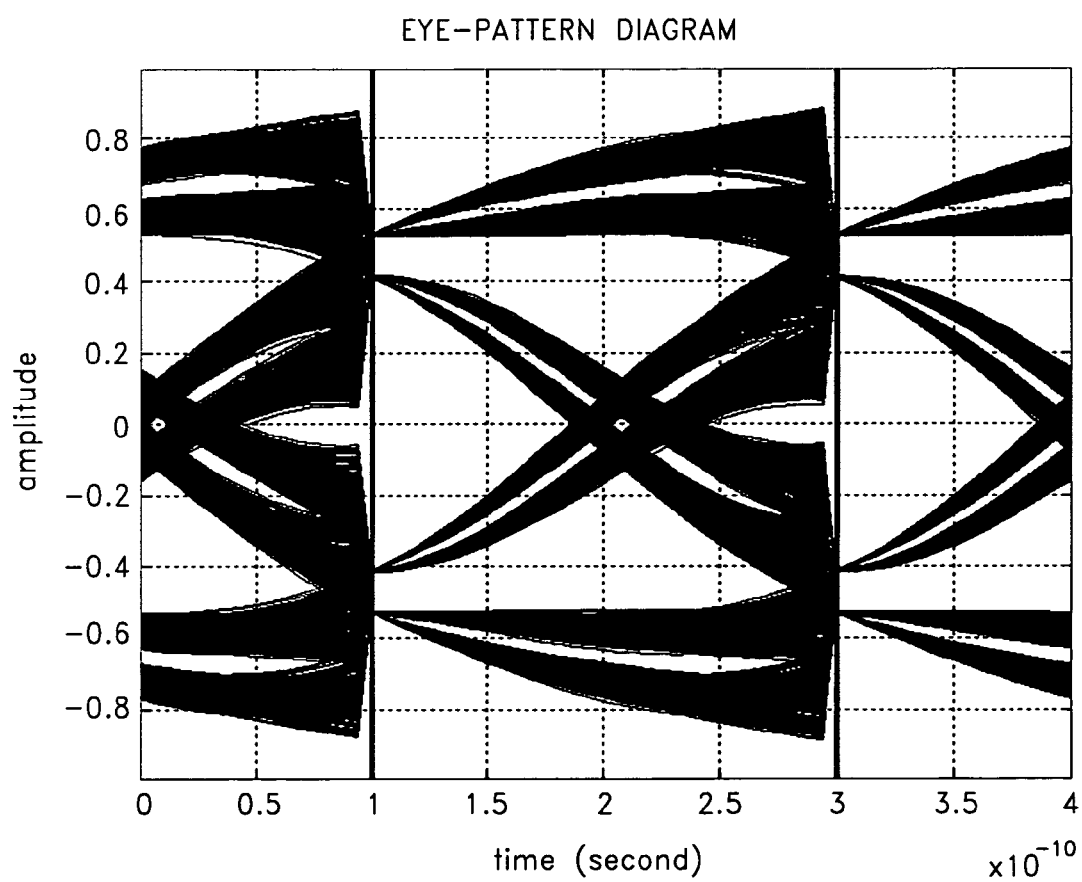
FIG. 6 illustrates a simulation of a data eye diagram for model 1.
Figure 7:
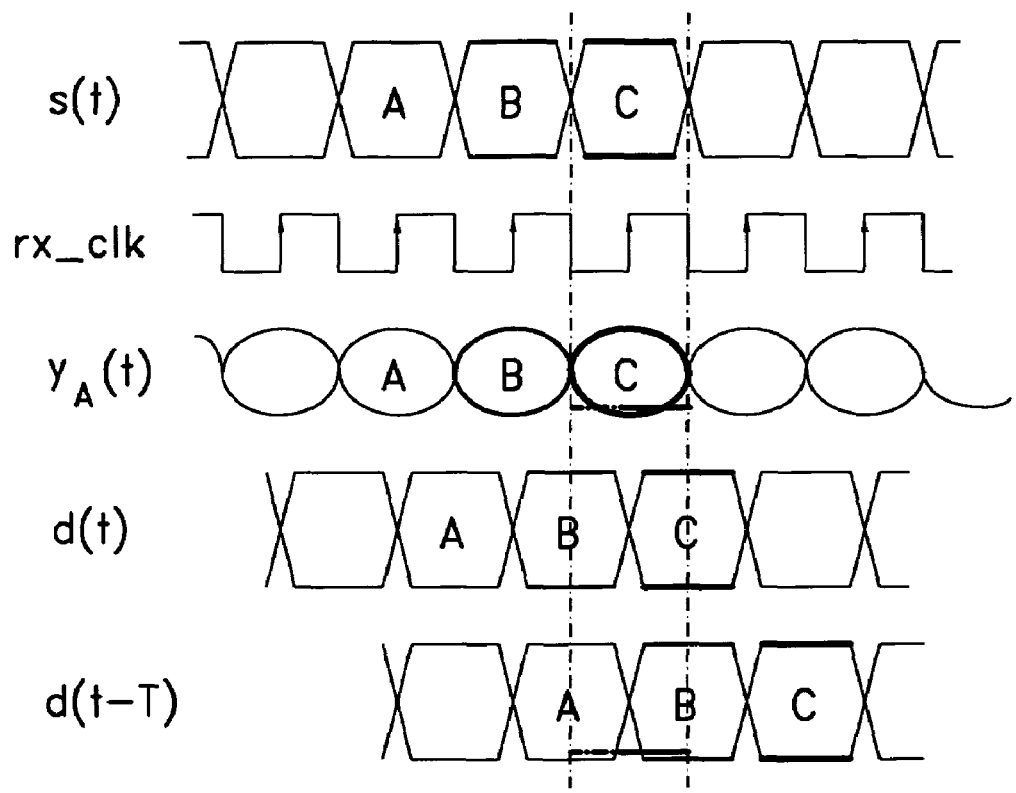
FIG. 7 illustrates an example of a timing diagram for model 1.

The conventional decision feedback equalizer (DFE) according to model 1, as illustrated in FIGS. 3, 6, and 7, fails to correct for inter-symbol interference (ISI) in the first half of a symbol interval of the equalized signal $y_A(t)$. An architecture of a receiver with an improved decision feedback equalizer (DFE) corresponding to the timing diagram of FIG. 10 will be described later in connection with FIG. 12. To remove additional ISI, the illustrated embodiment operates as shown by the timing diagram of FIG. 10.

The top 5 waveforms illustrated in FIG. 10 repeat the signals described earlier in connection with FIG. 7. As described earlier, the fifth waveform from the top corresponds to the delayed slicer output signal d(t−T) from the first delay element illustrated in FIG. 3. As discussed earlier in connection with FIG. 7, the delayed slicer output signal d(t−T) from the model of the conventional receiver is relatively poorly aligned with the equalized signal $y_A(t)$ (and the received signal $x_A(t)$, from which the equalized signal $y_A(t)$ is generated), and results in relatively poor cancellation of inter-symbol interference (ISI).

Figure 12:
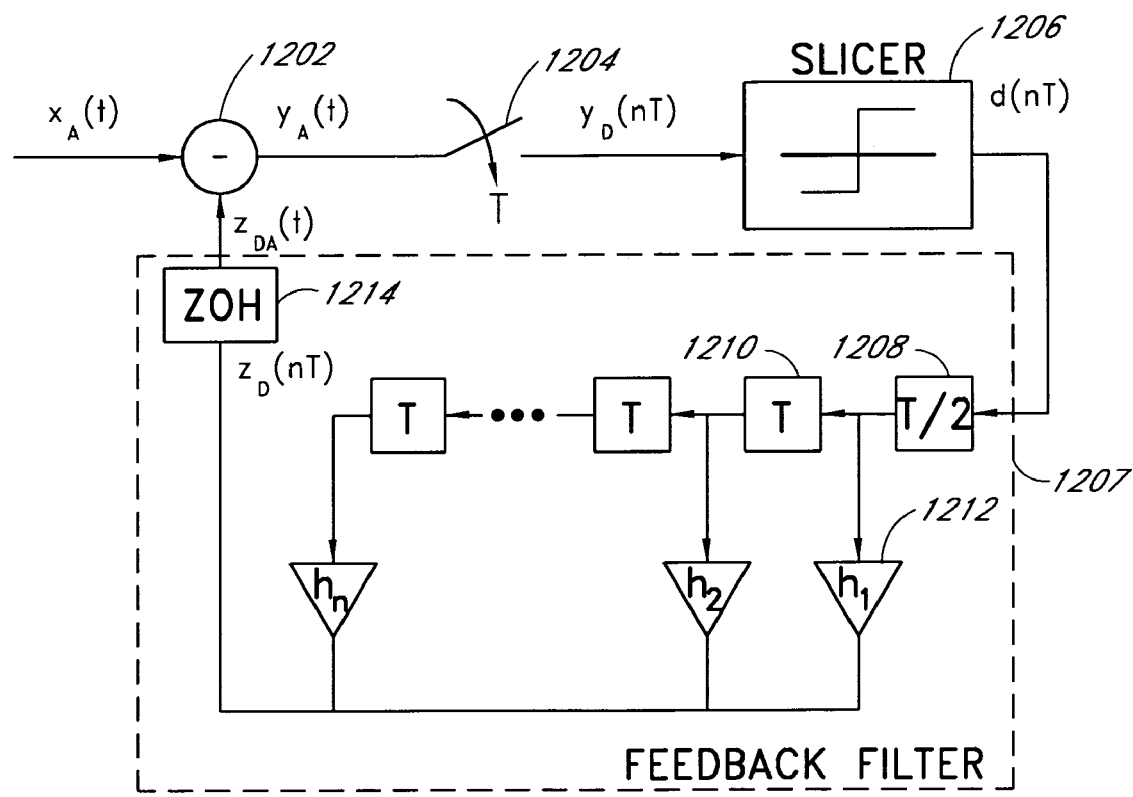
FIG. 12 illustrates an embodiment of a receiver with an improved decision feedback equalizer (DFE) configuration with reduced jitter according to improved model 1.

The corresponding delay element 1208 in the embodiment illustrated in FIG. 12 has a delay that is half a symbol period (delay of T/2). The bottommost waveform in FIG. 10 further corresponds to a half delay signal d(t−T/2) illustrating the behavior of the delay element 1208 by a half symbol period with respect to the slicer output d(t). The half delay signal d(t−T/2) is relatively well-aligned with the equalized signal $y_A(t)$ (and the received signal $x_A(t)$, from which the equalized signal $y_A(t)$ is generated), and additional signal d(t−T/2) should be used in recreating the inter-symbol interference (ISI) terms for compensating the post-cursor components of the previously detected symbols.

Figure 11:
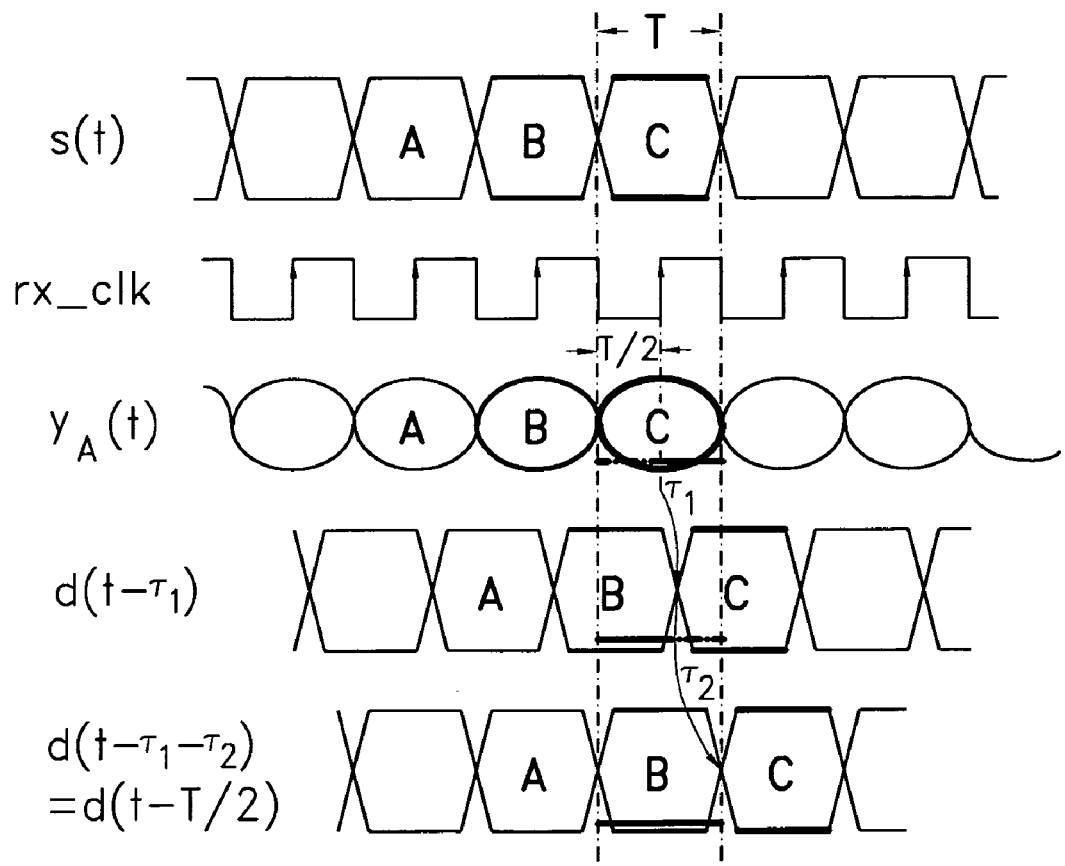
FIG. 11 illustrates an example of a timing diagram for improved model 2

Operation of Jitter Reducing Decision Feedback Equalizer (DFE) According to Improved Model 2 (FIG. 11)

Figure 4:
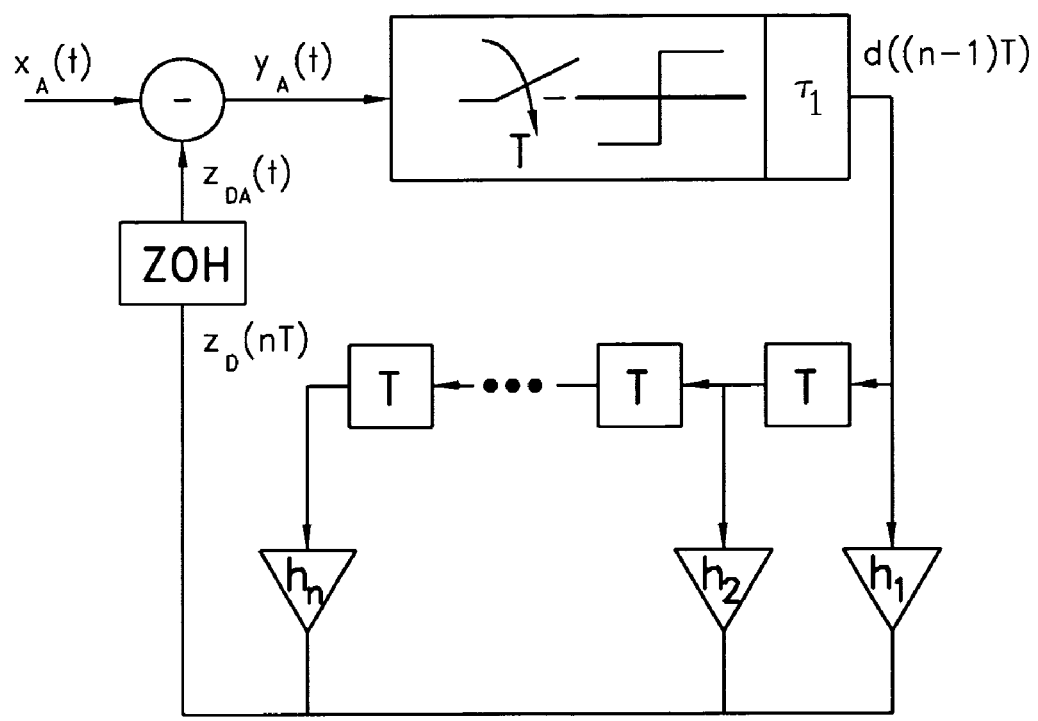
FIG. 4 illustrates a second model (model 2) of an analog decision feedback equalizer (DFE).
Figure 8:
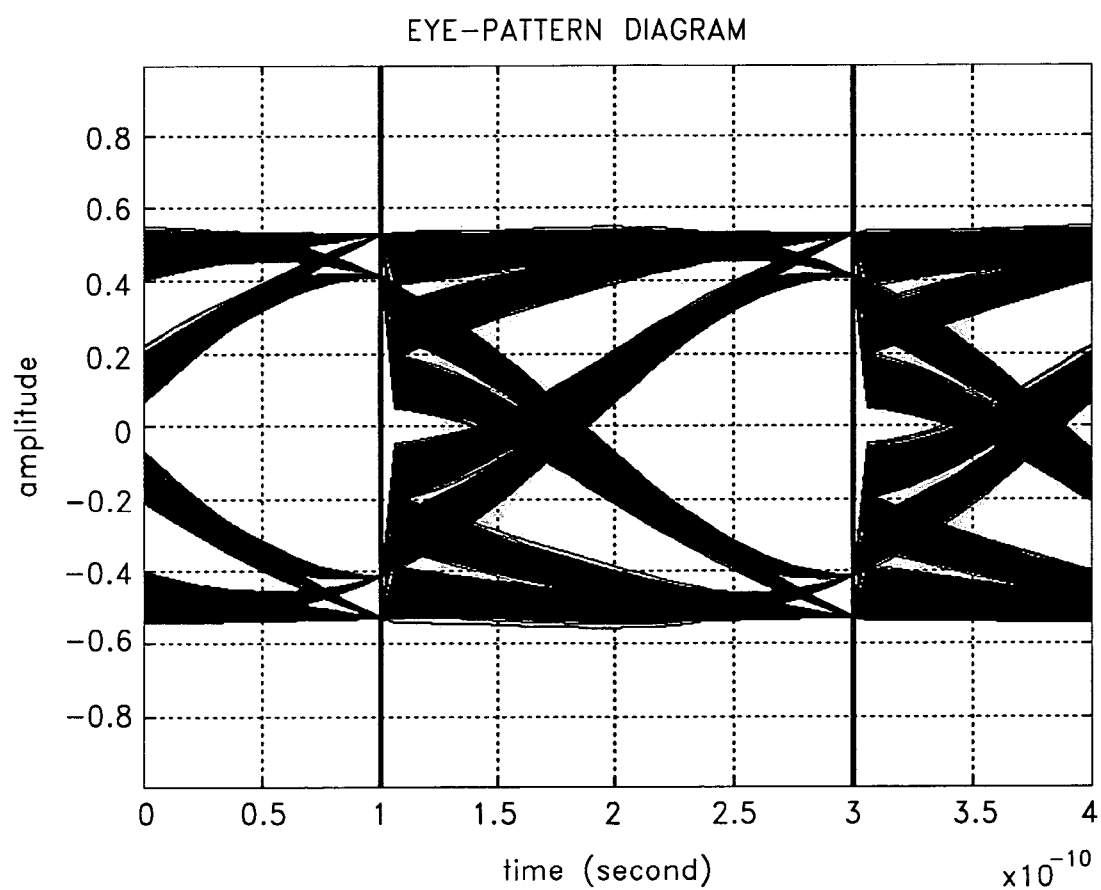
FIG. 8 illustrates a simulation of a data eye diagram for model 2
Figure 9:
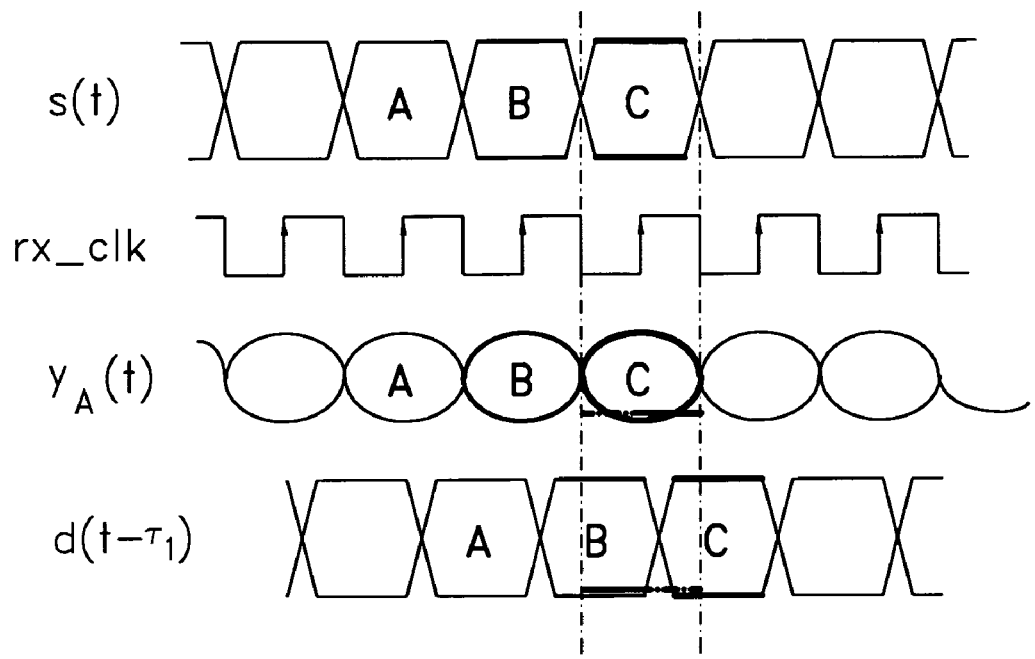
FIG. 9 illustrates an example of a timing diagram for model 2.

The conventional decision feedback equalizer (DFE) according to model 2, as illustrated in FIGS. 4, 8, and 9, typically fails to correct for inter-symbol interference (ISI) in the second half of a symbol interval of the equalized signal $y_A(t)$. To remove additional ISI and thereby improve jitter performance, the illustrated embodiment compensates for the delay of the slicer so that the equalizer operates as illustrated by the timing diagram of FIG. 11.

The topmost four waveforms illustrated in FIG. 11 are the same as the waveforms drawn earlier in FIG. 9. As illustrated in both FIGS. 9 and 11, the fourth waveform corresponding to the slicer output signal d(t−$\tau_1$) is relatively poorly aligned with the equalized signal $y_A(t)$ (and from the received signal $x_A(t)$, from which the equalized signal $y_A(t)$ is generated). Also, as discussed earlier in connection with FIG. 9, as illustrated in both FIGS. 9 and 11, a symbol carried by the slicer output signal d(t−$\tau_1$) is delayed from the same symbol carried by the equalized signal $y_A(t)$ by the sum of half a symbol interval T/2 and a flip-flop propagation delay $\tau_1$. This results in the relatively poor cancellation of inter-symbol interference (ISI) as illustrated by the data eye diagram of FIG. 8.

For relatively good post-cursor inter-symbol interference (ISI) cancellation for the resulting equalized signal $y_A(t)$, the output of the feedback filter should be aligned relatively well with the symbols in the sequence s(t) carried by the received signal $x_A(t)$. For improved model 2, relatively good alignment can be achieved by providing propagation delays $\tau_1$ and $\tau_2$ of approximately half a symbol period T/2. This aligns a compensated symbol from the feedback filter 1308 relatively well with its corresponding post cursor term in the received signal $x_A(t)$.

In one embodiment, to provide this relatively good alignment, an addition delay 1306 is provided for the feedback filter 1308 as will be described in greater detail later in connection with FIG. 13. The additional delay $\tau_2$ is such that the sum of the flip-flop delay $\tau_1$ and additional delay $\tau_2$ should be about equal to the delay of half of a symbol interval (delay of T/2). In an example with ideal components, where the flip-flop delay $\tau_1$ is zero or negligibly small, the additional delay $\tau_2$ for an embodiment according to model 2 should be about equal to the delay of half of a symbol interval (delay of T/2).

Model 1 of Jitter Reducing DFE (FIG. 12)

FIG. 12 illustrates an embodiment of a receiver in an improved decision feedback equalizer (DFE) configuration with reduced jitter according to improved model 1.

A received signal $x_A(t)$ is provided as an input to a subtracting circuit 1202. For the purposes of discussion, the subtracting circuit 1202 is assumed to have a negligibly small propagation delay that is ignored in the foregoing and the following analysis. Compensation in timing for an actual propagation delay in the subtracting circuit 1302 will be readily determined by one of ordinary skill in the art. The received signal $x_A(t)$ carries the signal sequence s(t) illustrated in FIG. 10. An equalized signal $y_A(t)$ corresponds to an output of the subtracting circuit 1202, which is provided as an input to a sampler 1204. For the timing diagram illustrated in FIG. 10, the sampler 1204 samples at the rising edge of the rx_clk signal as illustrated by the second waveform in FIG. 10.

A hard decision output d(nT) corresponds to an output of the slicer 1206 and is provided as an output of the receiver and as an input to a feedback filter (FBF) 1207. In one example, the hard decision output d(nT) is used as an output of the receiver. The feedback filter (FBF) includes one or more delay elements, and filter coefficients ($h_1, h_2 \ldots h_n$) also known as taps. The first delay element 1208 advantageously has a delay of half a symbol interval (delay of T/2). It will be understood that the grouping of blocks, such as the grouping of the first delay element 1208 into the feedback filter (FBF) 1207 can be arbitrary, and that the embodiment illustrated in FIG. 12 can also be drawn with the first delay element 1208 outside the feedback filter (FBF) 1207.

The first delay element 1208 generates the half delay signal d(t−T/2) as an output, and the half delay signal d(t−T/2) is relatively well-aligned with the equalized signal $y_A(t)$ (and the received signal $x_A(t)$, from which the equalized signal $y_A(t)$ is generated) and used in recreating the inter-symbol interference (ISI) terms for compensating the post-cursor components of the previously detected symbols.

The half delay signal d(t−T/2) output of the first delay element 1208 is provided as an input to a second delay element 1210 and to a multiplier 1212, which multiplies the half delay signal d(t−T/2) with a filter coefficient $h_1$. The delayed signal components of the various taps (T) of the feedback filter (FBF) 1207 are combined to generate a recreated signal $z_D(nT)$ or feedback signal, typically summed, and provided as an input to the subtracting circuit 1202. In addition, where differential circuits are used, it will be understood that both the positive and negative phases of a signal will typically be available by inverting differential inputs or outputs. A zero-order-hold (ZOH) 1214 block conceptually illustrates the discrete time nature of the slicer 1206 and the feedback filter (FBF) 1207 and does not typically correspond to a physical circuit. Accordingly, the recreated signal $z_D(nT)$ and the analog signal $z_{DA}(t)$ are typically the same signal.

In operation, the subtracting circuit 1202 subtracts the analog signal $z_{DA}(t)$ from the received signal $x_A(t)$ to generate the equalized signal $y_A(t)$. Advantageously, the illustrated decision feedback equalizer (DFE) aligns the analog signal $z_{DA}(t)$ with the received signal $x_A(t)$ relatively well to effectively reduce inter-symbol interference (ISI). This permits an embodiment according to the invention to generate the rx_clk signal used for timing of the sampler 1204 with less jitter, and can advantageously improve the bit error rate (BER) of the associated receiver.

In one embodiment, the delays in the feedback filter (FBF), e.g., delay element 1208, second delay element 1210, and the like, are implemented using flip-flops, such as D-type flip flops. The half symbol delay of the delay element 1208 can be easily implemented by triggering the corresponding flip-flop 1208 using both edges. Subsequent delay elements 1210, for delay of a full symbol interval, are implemented using just one clock edge (rising or falling).

Figure 13:
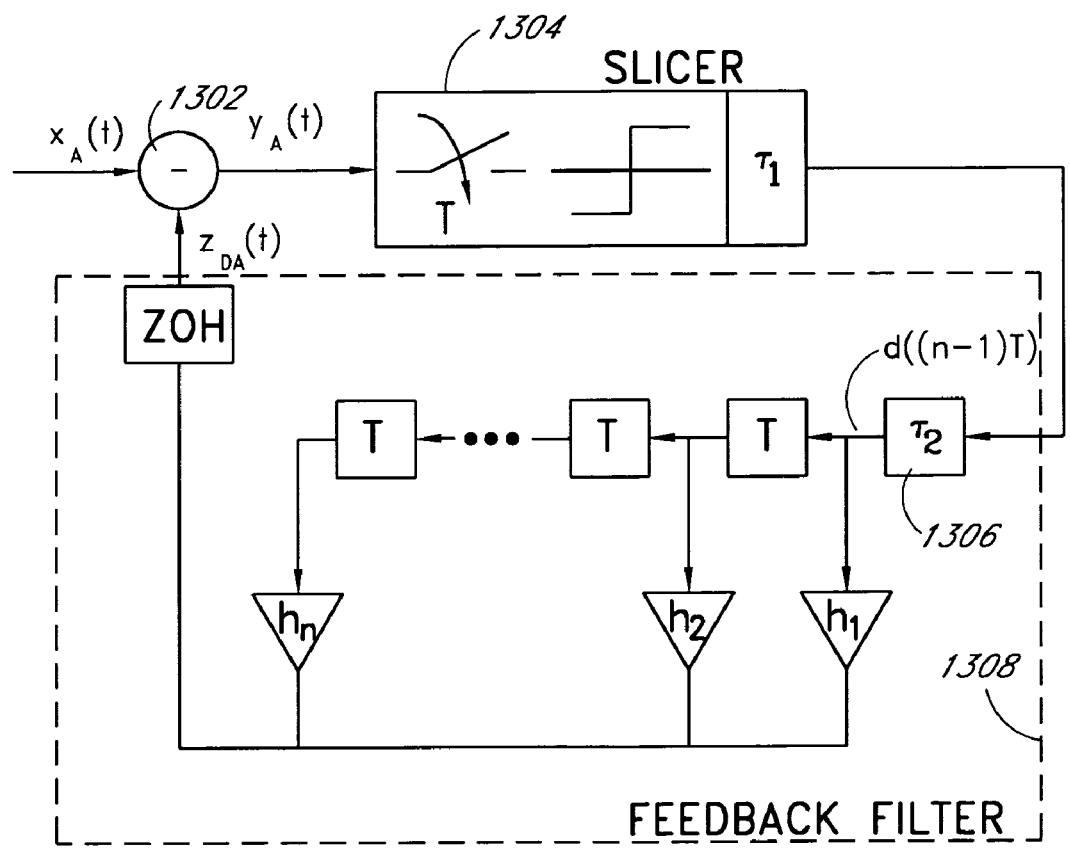
FIG. 13 illustrates an embodiment of a receiver with an improved decision feedback equalizer (DFE) configuration with reduced jitter according to improved model 2.

Model 2 of Jitter Reducing DFE (FIG. 13)

FIG. 13 illustrates an embodiment of a receiver in an improved decision feedback equalizer (DFE) configuration with reduced jitter according to improved model 2. As will be observed, the embodiment illustrated in FIG. 13 is similar to the conventional receiver of model 2 configuration described earlier in connection with FIG. 4.

A received signal $x_A(t)$ is provided as an input to a subtracting circuit 1302. For example, the received signal $x_A(t)$ can carry the signal sequence s(t) illustrated in FIG. 11. For the purposes of discussion, the subtracting circuit 1302 is assumed to have a negligibly small delay that is ignored in the foregoing and the following analysis. Compensation in timing for an actual propagation delay in the subtracting circuit 1302 will be readily determined by one of ordinary skill in the art.

An equalized signal $y_A(t)$ corresponds to an output of the subtracting circuit 1302, which is provided as an input to a slicer 1304. The illustrated slicer 1304 includes the functionality of a sampler, i.e., conversion to discrete time, and the slicer 1304 determines the symbols of the equalized signal $y_A(t)$. When functioning properly, the signal sequence s(t) is properly decoded from the equalized signal $y_A(t)$. The slicer 1304 has a propagation delay of $\tau_1$. This output is denoted the slicer output signal $d(t-\tau_1)$ and is illustrated as the fourth waveform from the top in FIG. 11.

For the timing diagram illustrated in FIG. 11, the slicer 1304 samples the equalized signal $y_A(t)$ at the rising edge of the rx_clk signal as illustrated by the second waveform in FIG. 11. The slicer output signal $d(t-\tau_1)$ is provided as an input to a delay element 1306 of a feedback filter (FBF) 1308.

As illustrated in FIG. 11, the delay element 1306 of the feedback filter 1308 of FIG. 13 further delays the slicer output signal $d(t-\tau_1)$ by time $\tau_2$ by generating signal $d(t-\tau_1-\tau_2)$, which is illustrated as the fifth waveform from the top of FIG. 11. In one embodiment, the delay element 1306 provides a combined delay $\tau_1+\tau_2=T/2$, i.e., $\tau_2=T/2-\tau_1$. When $\tau_1 \ll \tau_2$, the delay element 1306 can be easily implemented by triggering a corresponding flip-flop used for the delay element 1306 on both edges of the clock signal. In another embodiment, this delay element 1306 can be implemented with a latch, such as a transparent such that $\tau_2=T/2-\tau_1$.

Advantageously, the inter-symbol interference (ISI) terms for a relatively large portion of the symbol interval, such as a whole symbol interval, of the received signal $x_A(t)$ are canceled in the resulting equalized signal $y_A(t)$. A resulting data eye diagram for the resulting equalized signal $y_A(t)$ is illustrated in FIG. 14.

Figure 14:
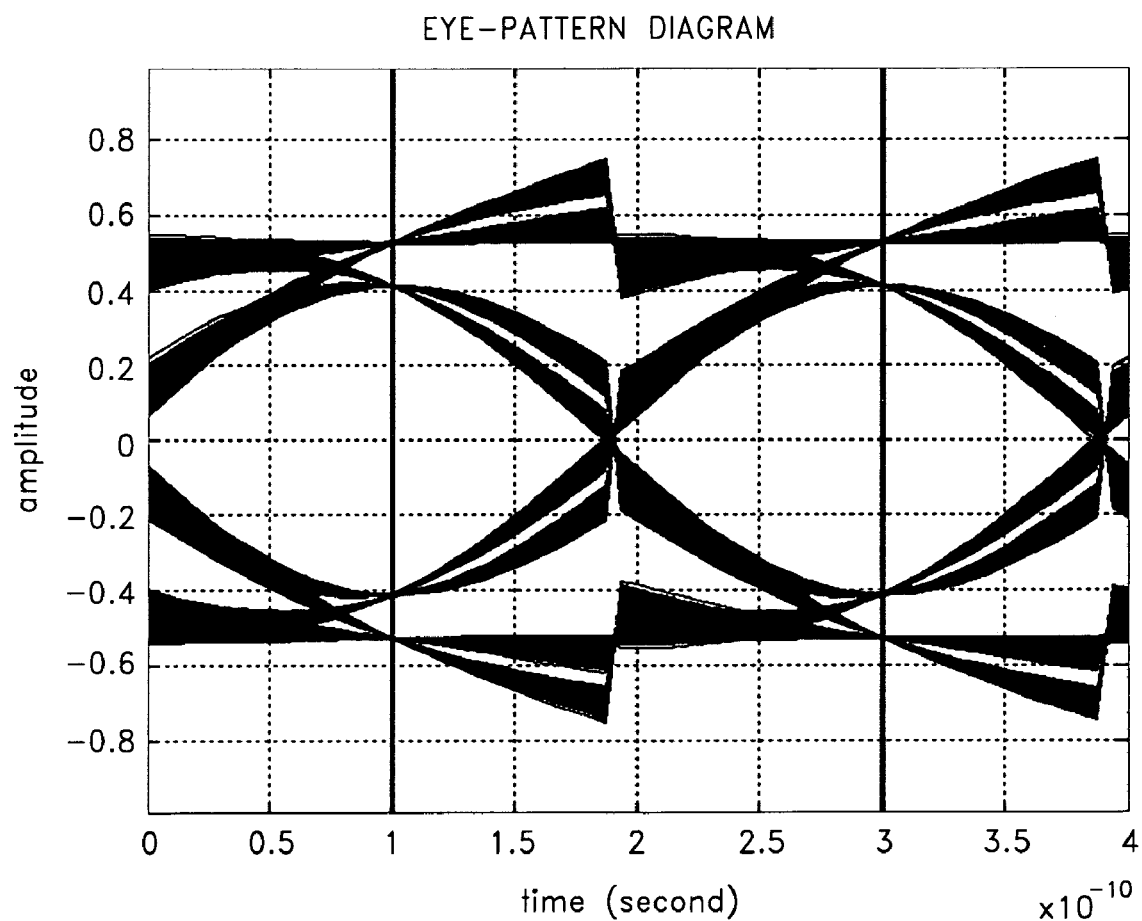
FIG. 14 illustrates a data eye diagram for a receiver an improved decision feedback equalizer (DFE).

Simulated Data Eye Diagram at the Slicer Input of a Jitter Reducing DFE (FIG. 14)

The data eye diagram illustrated in FIG. 14 for the slicer input corresponds to the equalized signal $y_A(t)$ of FIG. 12 (improved model 1) or FIG. 13 (improved model 2). FIG. 14 illustrates 2 data eyes, transitioning at about $1.82 \times 10^{-10}$ seconds. Sampling instants are represented by vertical lines at approximately $1.0 \times 10^{-10}$ and $3.0 \times 10^{-10}$ seconds.

Figure 5:
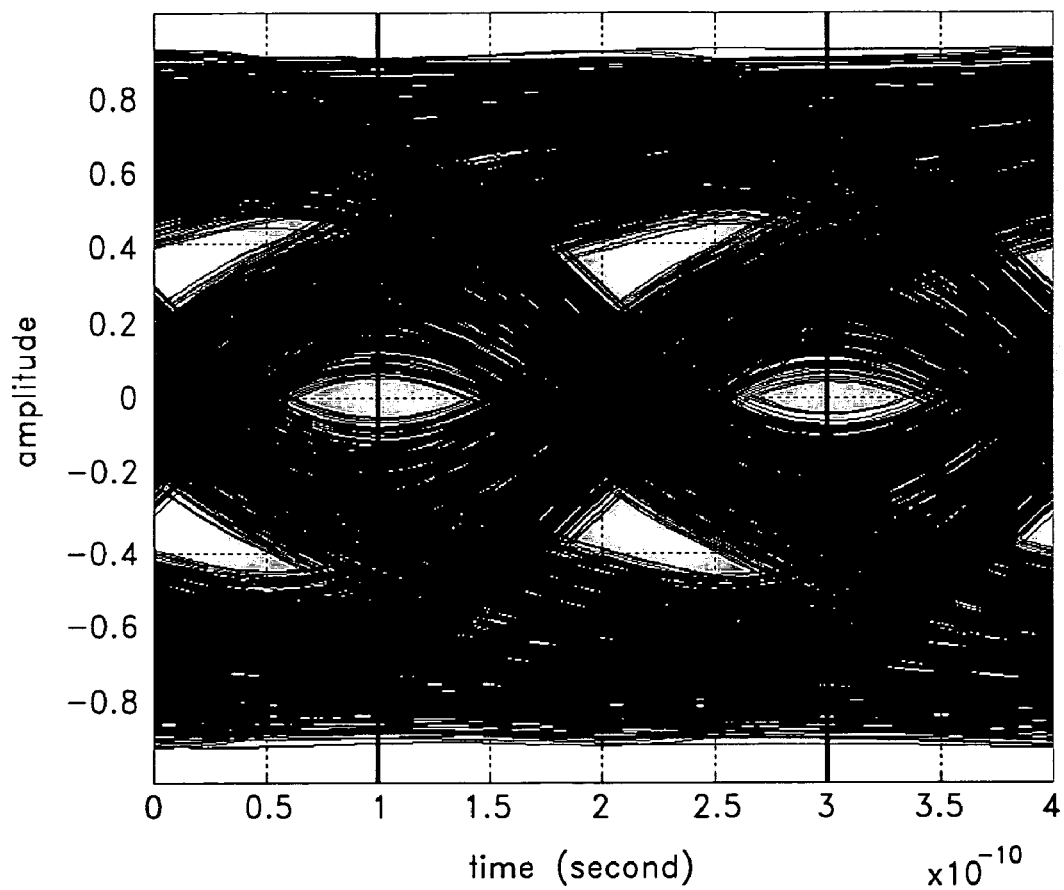
FIG. 5 illustrates a simulation of a data eye diagram for a received signal.

As illustrated by the relatively clean data eye diagrams of FIG. 14, as compared to the data eye diagrams of FIGS. 5, 6, and 8, it may be observed that inter-symbol interference (ISI) is advantageously reduced across virtually the entire symbol interval. This results in less jitter in a recovered clock signal, such as the received clock signal rx_clk illustrated in the timing diagrams, which in turn can result in a decreased bit error rate (BER).

FIG. 14 illustrates a step-like transition between the two data eyes at approximately $1.82 \times 10^{-10}$ seconds. This step is a result of the discrete time nature of the feedback filter, which can exhibit step behavior analogous to a digital to analog converter (DAC). This step is typically not a problem for a clock recovery unit. Optionally, these steps can be smoothed with a low-pass filter as described in connection with FIG. 15.

Figure 15:
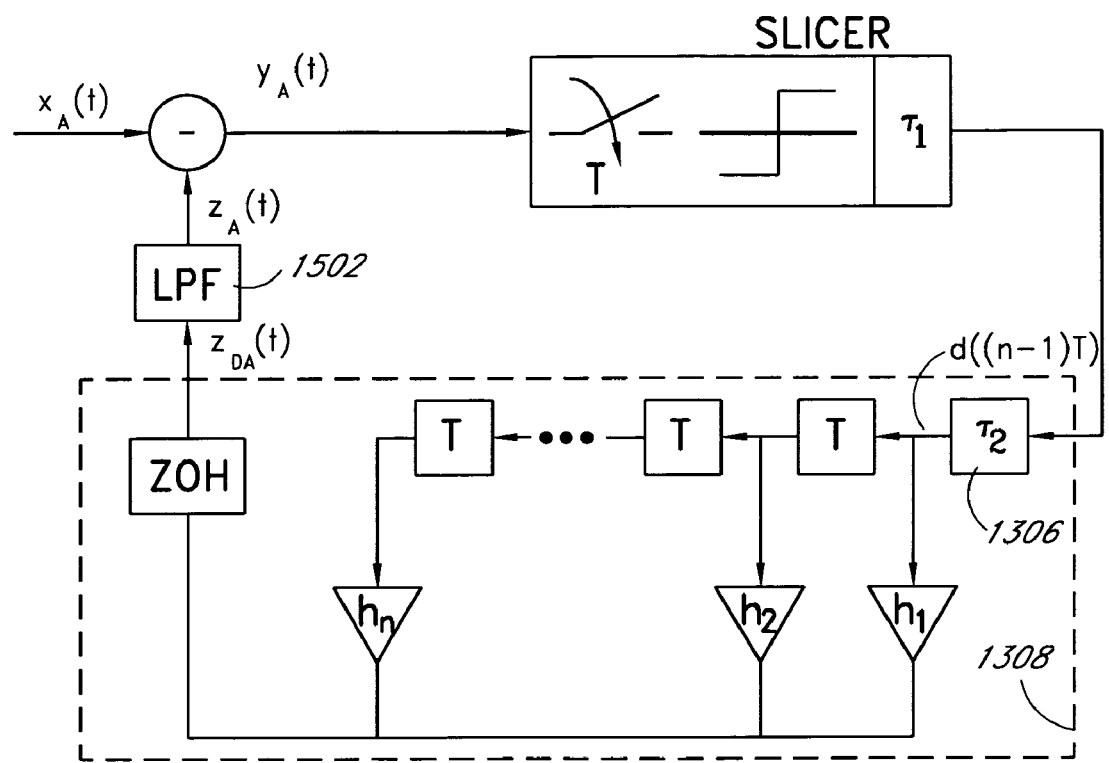
FIG. 15 illustrates an embodiment of a receiver with an improved decision feedback equalizer (DFE) and a low-pass filter.
Figure 16:
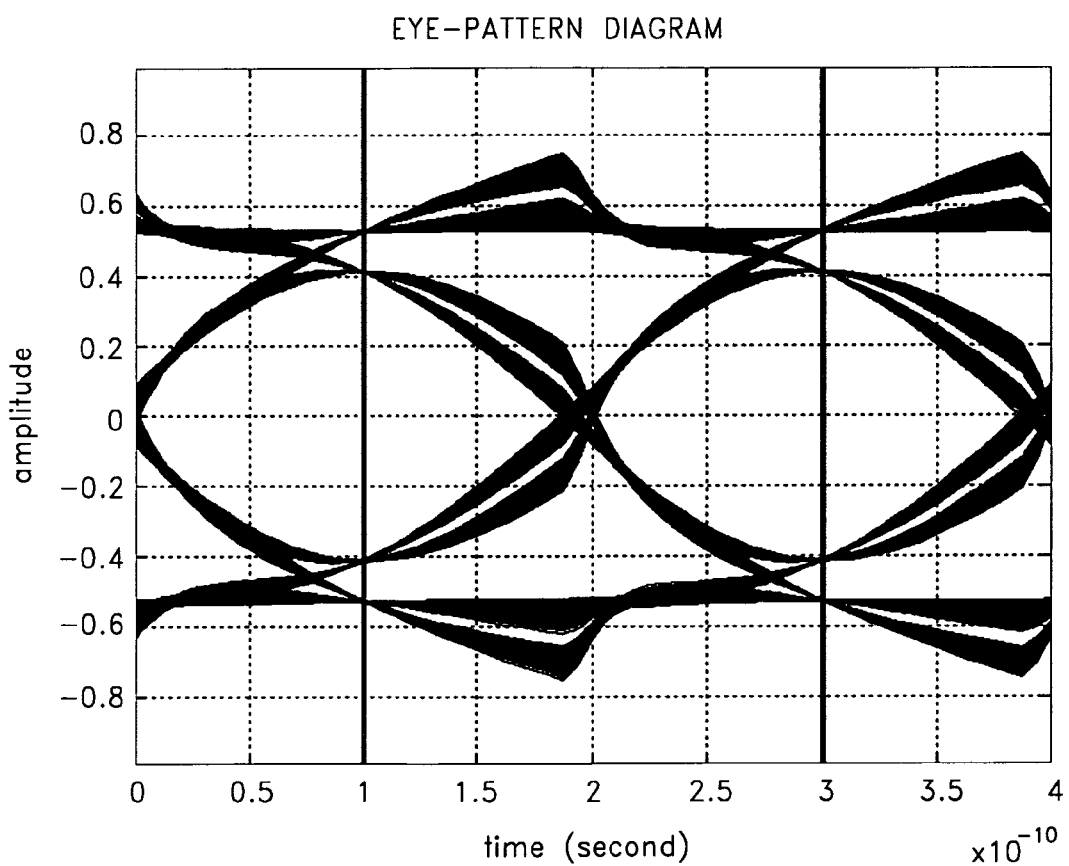
FIG. 16 illustrates a data eye diagram for a receiver an improved decision feedback equalizer (DFE) with a low-pass filter.

Low Pass Filtering (FIGS. 15 and 16)

One embodiment of a decision feedback equalizer further includes a low-pass filter 1502 as illustrated in FIG. 15. The low-pass filter 1502 can be applied to either the improved model 1 configuration or to the improved model 2 configuration. FIG. 15 illustrates the low-pass filter 1502 applied to the improved model 2 configuration previously described in connection with FIG. 13.

In the illustrated embodiment, the low-pass filter 1502 filters the analog signal $z_{DA}(t)$ output of the feedback filter 1308 for the corresponding input of the subtracting circuit 1302. The low-pass filtered signal is illustrated as $z_A(t)$ in FIG. 15. The low-pass filter 1502 advantageously smoothens the discrete transitions between symbol periods of the analog signal $z_{DA}(t)$. The low-pass filter 1502 can be used when, for example, a timing recovery circuit would otherwise have problems recovering a clock signal from the equalized signal $y_A(t)$. A broad variety of filters can be used for the low-pass filter 1502. In one example, an RC filter with a cutoff frequency of about the symbol rate is used. Other applicable filter techniques and cutoff frequencies will be readily determined by one of ordinary skill in the art.

FIG. 16 illustrates a simulated corresponding data eye diagram of the decision feedback equalizer with low-pass filtering, as described in FIG. 15. The simulation of FIG. 16, uses an RC-type of low-pass filter. As illustrated by FIG. 15, the step-like transition between the two data eyes at approximately $1.82 \times 10^{-10}$ seconds is smoother than the corresponding transition of FIG. 14.

Figure 17:
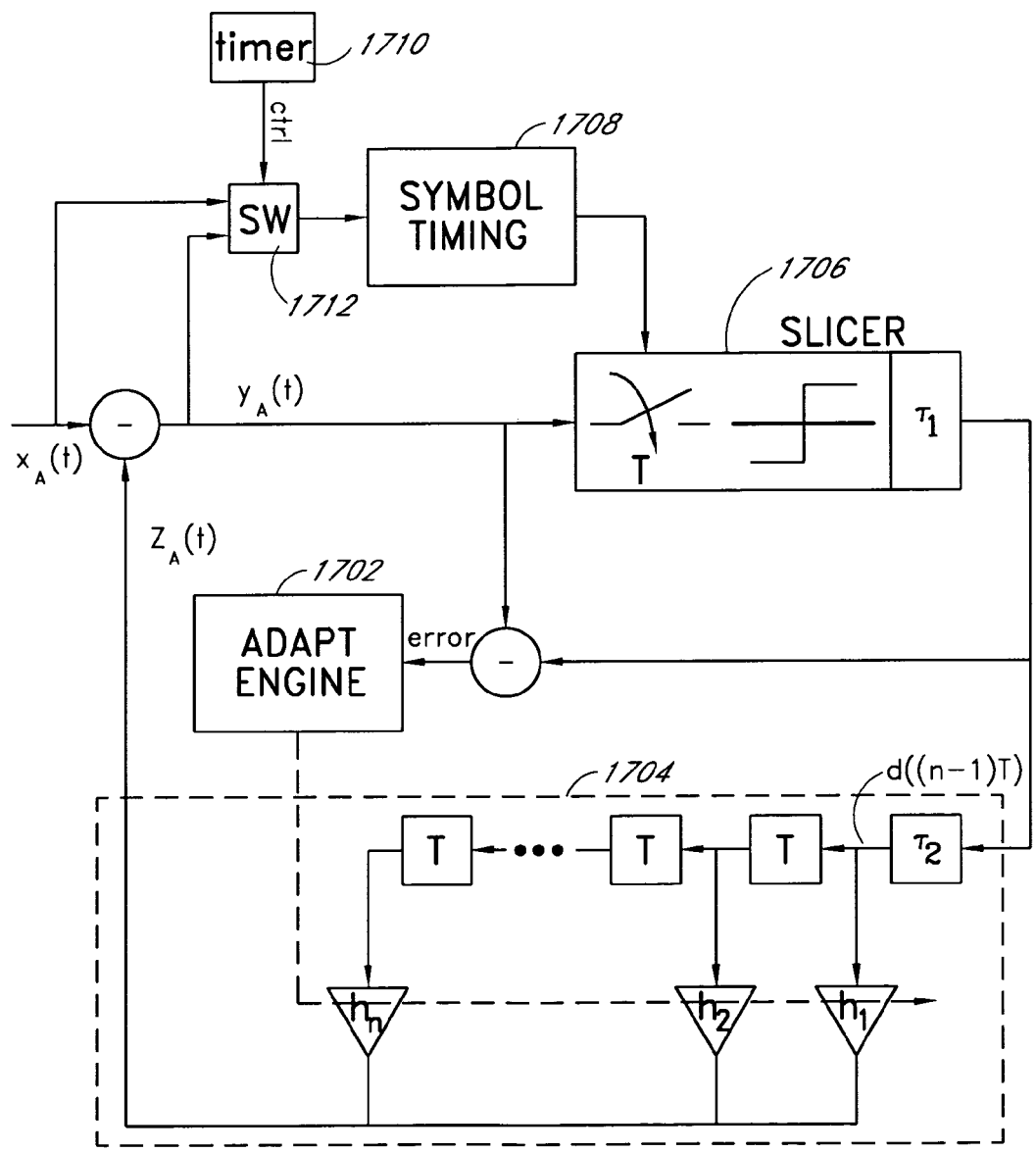
FIG. 17 illustrates an embodiment of a receiver with an improved decision feedback equalizer (DFE) and an adaptive update engine.
Figure 18:
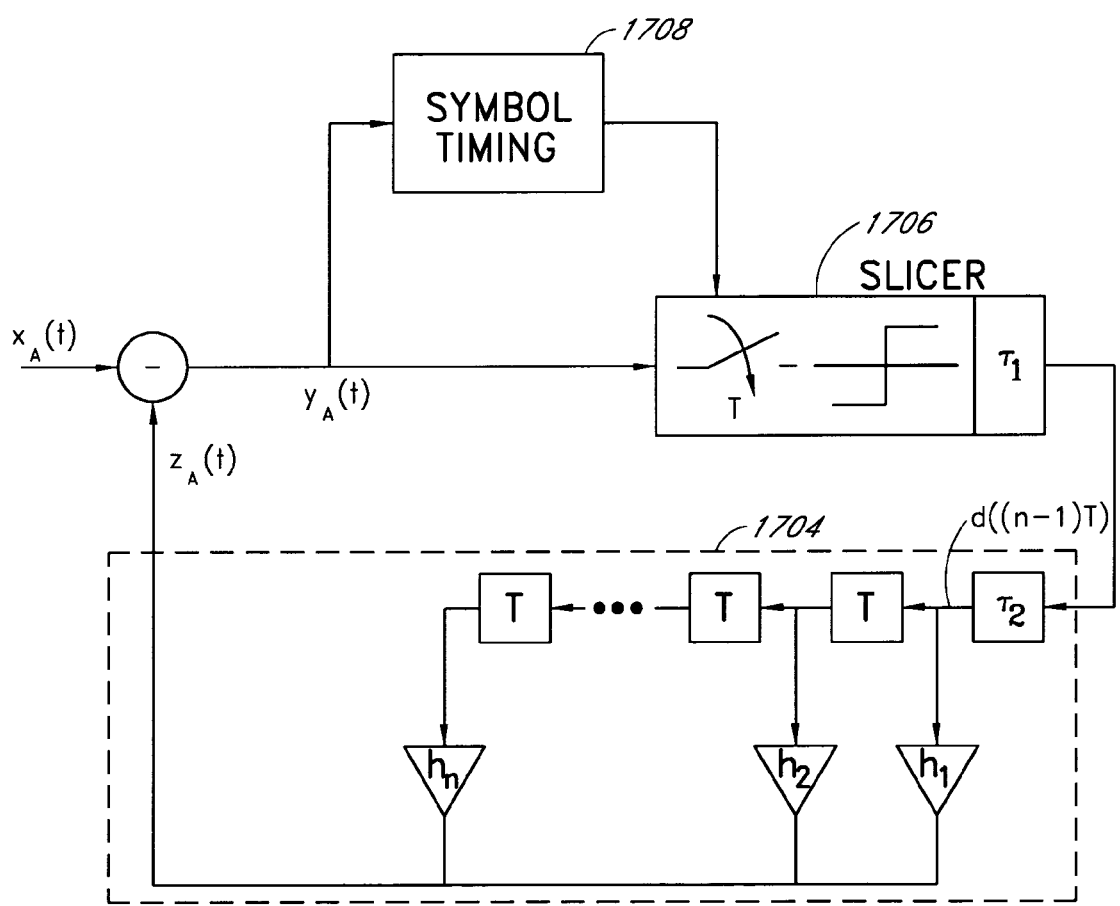
FIG. 18 schematically illustrates the embodiment of FIG. 17 after the coefficients for a feedback filter have been determined and fixed.

Application of Jitter Reducing DFE in Initially De-Coupled Timing and Equalizer Loops (FIGS. 17 and 18)

The embodiment illustrated in FIG. 17 illustrates a symbol timing path and an adaptive update engine 1702. The adaptive update engine 1702 analyzes the equalized signal $y_A(t)$ and the slicer output d(nT) to determine appropriate coefficients ($h_1, h_2, \ldots h_n$) for relatively good inter-symbol interference (ISI) cancellation in the feedback filter 1704.

The adaptive update engine 1702 should determine the coefficients with a relatively stable timing reference for the slicer 1706. In the illustrated embodiment, a symbol timing circuit 1708 generates the received clock signal rx_clk for the slicer 1706. When the adaptive update engine 1702 is determining the coefficients, the symbol timing circuit 1708 should recover the clock signal rx_clk from the received signal $x_A(t)$. After the adaptive update engine 1702 has determined the coefficients, the symbol timing circuit 1708 can switch to using the equalized signal $y_A(t)$ as an input to recover the clock signal rx_clk.

Typically, the receiver with the decision feedback equalizer (DFE) using adaptive updates is initialized as follows. A timer 1710 controls a switch 1712, such as a multiplexer, such that initially, the received signal $x_A(t)$ is provided as an input to the symbol timing circuit 1708. Accordingly, initially, the clock recovery by the symbol timing circuit 1708 is based on the received signal $x_A(t)$. During this time, the adaptive update engine 1702 determines the filter coefficients. When the appropriate coefficients are determined, the filter coefficients can be fixed. Of course, it will be understood that the adaptive updates can also be re-executed as needed. After a predetermined elapsed time, the timer 1710 controls the switch 1712 such that the equalized signal $y_A(t)$ is provided as an input to the symbol timing circuit 1708.

For clarity, FIG. 18 illustrates the effective circuit of FIG. 17 for normal operation, after the coefficients have been determined and fixed, and after the switch 1712 has switched to the equalized signal $y_A(t)$. It will be understood that the coefficients can be updated later, such as periodically or in response to a detected increase in bit error rate (BER). The use of the equalized signal $y_A(t)$ during normal operation of the symbol timing circuit 1704 permits the associated timing loop parameters to be relaxed as the equalized signal $y_A(t)$ is less noisy than the received signal $x_A(t)$, which translates to lower power consumption in the implementation of the digital feedback equalizer. In one embodiment, when the channel characteristics are relatively well known, the feedback filter coefficients can be preset to the appropriate values and fixed during a convergence period for the symbol timing circuit 1708. After the symbol timing circuit 1708 has converged, such as achieved convergence of a timing loop, the receiver with the improved DFE can be switched to the adaptive mode so that the slowly varying channel characteristics are tracked.

Returning now to FIG. 17, the predetermined elapsed time for the timer 1710 should be long enough to permit the adaptive update engine 1702 to complete its determination of the coefficients. In another embodiment, the adaptive update engine controls the switch 1712 during adaptive updates so that timing to the slicer 1706 is not adversely affected by changes to filter coefficients.

Examples of applicable algorithms to use in the adaptive update engine 1702 include least-mean square (LMS), recursive least-square (RLS), and the like. Other applicable algorithms will be readily determined by one of ordinary skill in the art. In addition, it should be noted that where the ISI characteristics are relatively well-known, it will be understood that the coefficients can be predetermined and such adaptive techniques are not necessary.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A receiver with a decision feedback equalizer (DFE), the receiver comprising:
a subtracting circuit configured to receive a received signal and a feedback signal as inputs, where the received signal has embedded therein symbols at a symbol rate with symbol intervals, where the subtracting circuit is configured to subtract the feedback signal from the received signal to generate an equalized signal for reduction of inter-symbol interference (ISI);
a slicer in communication with the subtracting circuit to receive the equalized signal as an input, where the slicer is configured to determine a logical state of the equalized signal and to provide an output signal; and
a feedback filter circuit in communication with the slicer and the subtracting circuit, where the feedback filter circuit is configured to receive the output signal from the slicer as an input and to provide the feedback signal to the subtracting circuit, where the feedback signal has canceling terms for cancellation of one or more postcursor ISI terms by the subtracting circuit, where the feedback filter circuit includes a first delay tap for a feedback filter, where the first delay tap is configured to delay the feedback signal such that transitions of the feedback signal are substantially time aligned with symbol interval transitions of the received signal for the subtracting circuit.

2. The receiver as defined in claim 1, further comprising a clock recovery circuit in communication with the slicer to provide a clock signal, wherein the clock recovery circuit is configured to generate the clock signal from the equalized signal at least during normal operation, wherein the slicer samples the equalized signal with an edge of the clock signal, where the edge of the clock signal is approximately in the middle of a symbol interval in the equalized signal.

3. The receiver as defined in claim 1, wherein the delay of the first delay tap is about half of a symbol interval.

4. The receiver as defined in claim 1, wherein the slicer further comprises a flip-flop such that a propagation delay of the slicer corresponds to a propagation delay for the flip flop, and where the delay of the first delay tap corresponds to about a difference between half of a symbol interval and the slicer propagation delay.

5. The receiver as defined in claim 1, wherein the first delay tap is implemented with a transparent latch.

6. The receiver as defined in claim 1, further comprising a low-pass filter for the feedback signal disposed in a communication path between the feedback filter circuit and the subtracting circuit.

7. The receiver as defined in claim 6, wherein the low-pass filter is an RC filter.

8. The receiver as defined in claim 1, further comprising an adaption engine in communication with the feedback filter circuit, where the adaption engine is configured to determine filter coefficients for the feedback filter circuit.

9. The receiver as defined in claim 2, further comprising a switch in communication with the clock recovery circuit, where the switch is configured to provide the clock recovery circuit with the equalized signal during normal operation and to provide the clock recovery circuit with the received signal during determination of the filter coefficients by the adaption engine.

10. The receiver as defined in claim 1, wherein the receiver is embodied in a serializer/deserializer (SerDes).

11. The receiver as defined in claim 1, wherein the delay of the first delay tap is a fraction of a delay of other taps of the feedback filter.

12. The receiver as defined in claim 1, wherein the feedback filter comprises a plurality of delay taps, wherein the first delay tap is triggered via both a rising and a falling clock edge, wherein other delay taps are triggered by a single clock edge.

13. A receiver with a decision feedback equalizer (DFE), the receiver comprising:
a subtracting circuit configured to receive a received signal and a feedback signal as inputs, where the received signal has embedded therein symbols at a symbol rate with symbol intervals, where the subtracting circuit is configured to subtract the feedback signal from the received signal to generate an equalized signal for reduction of inter-symbol interference (ISI);
a slicer in communication with the subtracting circuit to receive the equalized signal as an input, where the slicer is configured to determine the symbols in the equalized signal and to provide an output signal;
a feedback filter circuit in communication with the slicer and the subtracting circuit, where the feedback filter circuit is configured to receive the output signal from the slicer as an input and to provide the feedback signal to the subtracting circuit, where the feedback signal has canceling terms for cancellation of one or more postcursor ISI terms by the subtracting circuit; and
means for timing the feedback signal such that a transition in the feedback signal is time aligned with a transition in the received signal.

14. A method of feedback equalization in a receiver, the method comprising:
receiving a received signal having embedded therein symbols at a symbol rate with symbol intervals;
subtracting a feedback signal from the received signal to generate an equalized signal;
determining symbols of the equalized signal for an output signal;
generating the feedback signal from the output signal, wherein the feedback signal includes cancellation terms for cancellation of inter-symbol interference (ISI); and
timing the feedback signal such that a transition in the feedback signal is time aligned with a transition in the received signal.

15. The method as defined in claim 14, further comprising aligning the transition in the feedback signal with a transition of an immediately subsequent symbol in the received signal.

16. The method as defined in claim 14, further comprising timing the feedback signal by delaying the output signal by about half a symbol interval.

17. The method as defined in claim 14, wherein a transition for a symbol in the output signal is delayed from a corresponding symbol in the equalized signal by a propagation delay of a flip-flop associated with a slicer, further comprising timing the feedback signal by about half the symbol interval less the propagation delay of the slicer flip-flop.

18. The method as defined in claim 14, further comprising low-pass filtering the feedback signal.

19. The method as defined in claim 14, further comprising low-pass filtering the feedback signal with a low-pass resistor-capacitor (RC) filter.

20. The method as defined in claim 14, further comprising adaptively determining filter coefficients for generation of the feedback signal.

21. The method as defined in claim 14, further comprising:
generating timing signals from the received signal for determining the symbols of the equalized signal in an adaptive mode of operation;
adaptively determining filter coefficients for generation of the feedback signal during the adaptive mode of operation; and
generating timing signals from the equalized signal in a normal mode of operation.

22. The method as defined in claim 14, wherein the method is embodied in a serializer/deserializer (SerDes).

* * * * *